3,564,693
AUTOMATIC CONVEYING AND ASSEMBLY MACHINE
Marcus J. Auernhammer, Detroit, Mich., assignor to Visi-Trol Engineering Company, Detroit, Mich., a corporation of Michigan
Filed Jan. 10, 1969, Ser. No. 790,347
Int. Cl. B23p 19/04; B23g 7/10
U.S. Cl. 29—208           9 Claims

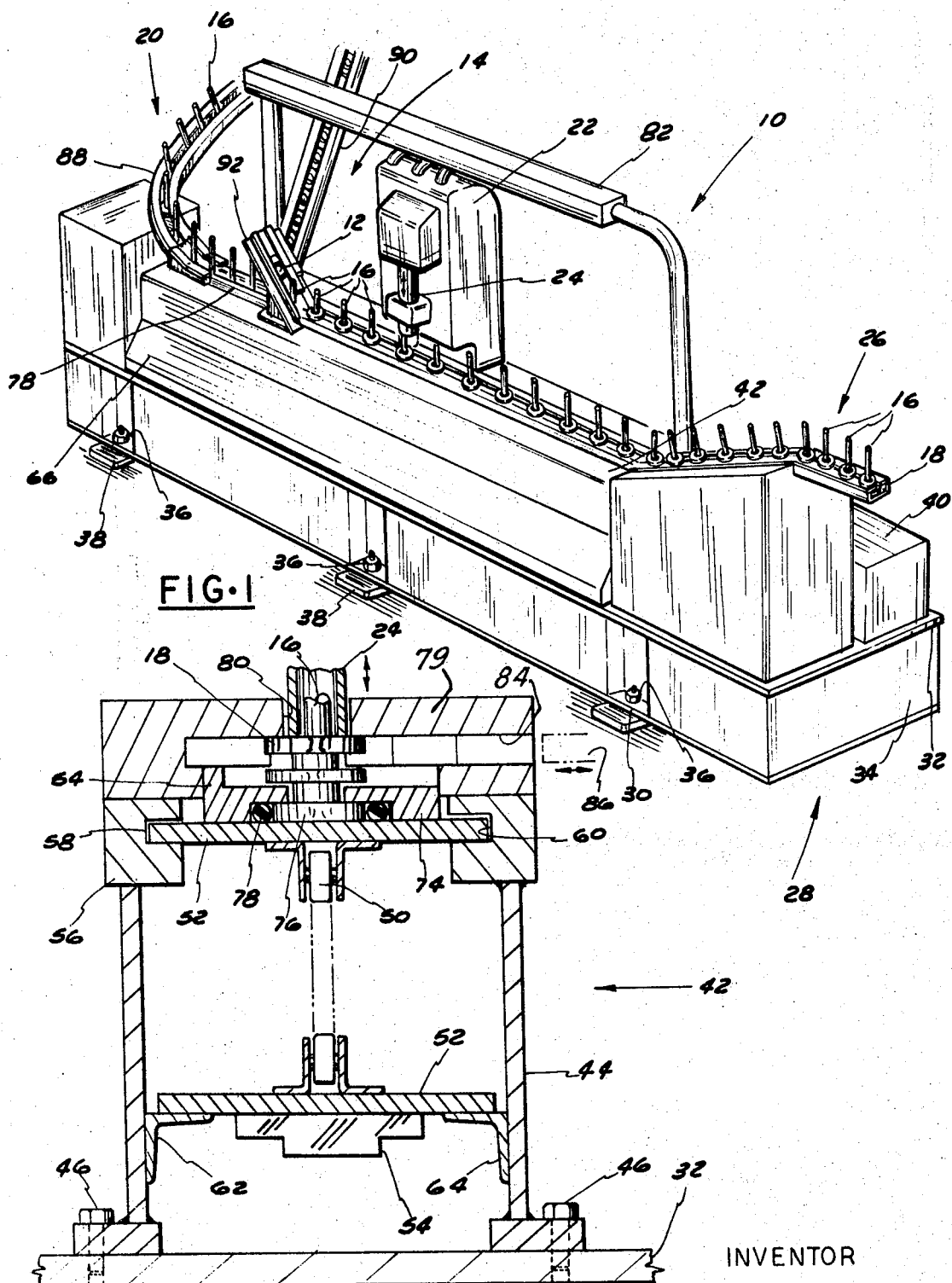

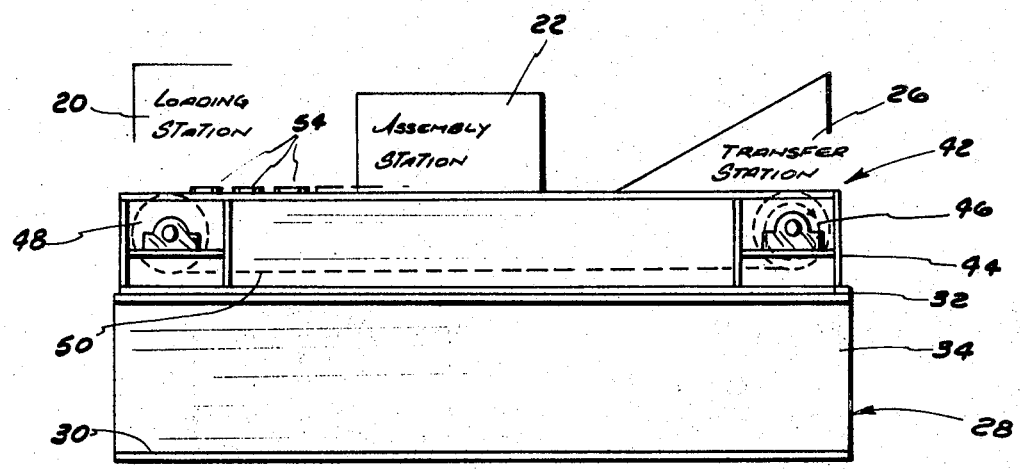
FIG·3
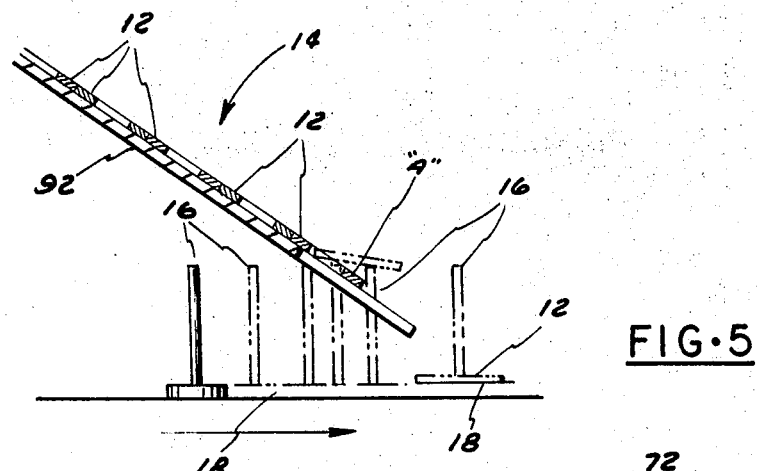
FIG·5
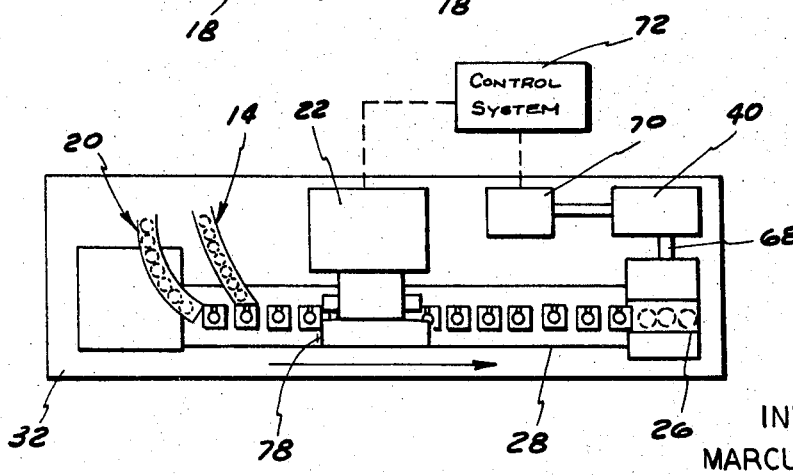
FIG·4
INVENTOR
MARCUS J. AUERNHAMMER
BY
Hauke Knass Gifford & Patalidis
Attorneys

United States Patent Office 3,564,693
Patented Feb. 23, 1971

ABSTRACT OF THE DISCLOSURE

An automatic assembly machine having an over and under, linear conveyor for moving the work mounted along one side of an elongated, unitary base, and various tooling and assembly stations mounted on the base, adjacent the conveyor, in such a manner as to be accessible for maintenance, adjustment and the like.

BACKGROUND OF THE INVENTION

This invention relates to an automatic assembly machine for the assembly of relatively small components, and more particularly to such a machine in which the components are indexed along a line so as to be aligned with a series of stations that progressively unite the components into an assembly.

Small manufactured parts are usually assembled on dial type, rotary indexing machines in order to achieve high production rates. In such machines, the components making up the part are fed into a conveyor which indexes the components in a circular path about a cluster of tooling stations. Each tooling station performs an assembly operation on the components as they are indexed so as to progressively assemble the part.

One problem associated with such rotary assembly machines is that only one side of the conveyor is readily accessible for maintenance, adjustment and the like. Because of their central location, the tooling stations are relatively inaccessible. Thus in the event of a breakdown, the assembly operation often must be terminated for a substantial length of time because a portion of the machine has to be disassembled in order to correct the malfunction.

Large manufactured parts have in the past often been assembled on an assembly line on which the tooling stations are mounted in-line and parallel to an over and under conveyor. Work supporting fixtures are advanced by the conveyor along an upper horizontal path in which they receive and index the part components past the loading and tooling stations to a transfer station where the assembled parts are removed from the fixtures. The fixtures are then returned along a lower horizontal path to the initial loading station. However because of the rather close tolerances that must be precisely maintained between the various loading and assembly stations for small part assembly, and because of the relatively short indexing increment, usually in the magnitude of 2 to 6 inches, such parts have usually been assembled on rotary machines as opposed to in-line assembly. One reason is that the tooling and conveyor components of conventional in-line assembly systems are mounted directly on the floor of the assembly plant so that it is difficult to maintain these moving components in precise alignment.

SUMMARY OF THE INVENTION

The broad purpose of the present invention is to provide an automatic assembly machine in which the work fixtures are carried and indexed by an over and under conveyor chassis that is mounted on an elongated, unitary base, and the various tooling stations as well as the drive unit are mounted on the same base adjacent the conveyor. Preferably the various assembly stations for feeding, placing, pressing, shot pinning and the like are all mounted in-line on a raised base plate that forms part of an elongated base. The conveyor is mounted along one side of the base and the assembly stations are mounted along the other side. All the tooling stations and assembly stations, as well as the conveyor and drive components are readily accessible for either adjustment, maintenance or repair because they are not grouped together. The size of the base can vary depending on the nature of the assembly. For purpose of example, the length of the base can range from about 6 to 20 feet, and its width can be from 1 to 5 feet to provide an adequate surface on which to mount the various stations and feed supports, unless floor feeders are employed.

By mounting the major moving components on a common, unitary base, the entire assembly machine is more rigid than conventional in-line assembly systems in which the length of the conveyor requires that the tooling stations be mounted on the floor of the assembly plant. Another advantage of such a unitary structure is that normally the assembly machine is manufactured in a plant that is remote from the assembly plant, and then is transferred to the assembly plant. By mounting the major operating components on a common base, the entire machine can be adjusted and tested before the transfer thereby reducing the usual setup and testing period.

Still other advantages will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is a perspective view of an automatic assembly machine illustrating the preferred embodiment of the invention;

FIG. 2 is an enlarged transverse cross section through the indexing chassis of the machine of FIG. 1;

FIG. 3 is a schematic front elevational view of the perferred machine;

FIG. 4 is a schematic top plan view of the preferred machine; and

FIG. 5 is an enlarged view of one of the component feed stations.

DESCRIPTION OF THE PREFERRED EMBODIMENT

Now referring to the drawings, FIG. 1 shows a preferred automatic assembly machine generally indicated at 10. For purpose of illustration, the machine 10 is employed to place a washer 12 at a feed station 14 onto the stem 16 of a cap 18 that is fed at a loading station 20. The washer placing function is carried out by a stripping device at station 14. The cap 18 and washer 12 are then advanced to a tooling station 22 where a tool 24 press fits the washer into the cap. The assembly is advanced to a transfer station 26 for removal from the machine. This asembly operation is performed on several hundred caps per hour.

The assembly machine includes an elongated, metal base 28 formed of a one inch thick lower plate 30, and a one inch thick upper plate 32 which are joined together by a series of metal panels welded together into a wall 34. The wall 34 extends around the periphery of the two plates 30 and 32. A series of bolts 36 carried by the lower plate 30 are mounted on pads 38 which level the machine on the floor of the assembly plant. The upper plate 32 provides a flat surface for mounting a drive means 40, an indexing chassis 42 and the tooling station 22.

The indexing chassis 42 comprises an elongated frame 44 which is connected by fasteners 46 to the plate 32 as can best be seen in FIG. 2. The frame 44 extends the major length of the base 28 and is bolted adjacent one of its longitudinal sides. As best shown in FIG. 4, the plate 32 has a sufficient width to accommodate the chassis 42 adjacent one side, and the drive means 40 and the tooling station 22 adjacent its other side.

A drive sprocket 46 is mounted on the frame 44 adjacent the transfer station 26, and a take-up sprocket 48 is mounted on the frame 44 adjacent the loading station 20. A drive chain 50 is connected between the two sprockets.

Referring to FIG. 2, a platen 52 is connected to each link of the chain 50. Each platen 52 supports a work fixture 54. Thus the platens 52 and the work fixtures 54 are moved between the loading station 20 and the transfer station 26 as the drive sprocket 46 is rotated.

An elongated, linear track 56 mounted on the frame 44 has a pair of opposed channel shaped sections 58 and 60 which receive the side edges of each platen 52 as it leaves the take-up sprocket 48. The fixtures 54 are guided by the track along an upper horizontal, linear path of motion as they are indexed toward the transfer station. Similarly a pair of elongated supports 62 and 64, also mounted on the frame 44, form a lower, horizontal return path for the platens 52 which is beneath their upper horizontal path.

As viewed in FIG. 3, the drive sprocket 46 is rotated by drive means 40 in the clock-wise direction so that the work fixtures 54 are alternately moved along their upper horizontal path from the loading station to the transfer station, and then returned along their lower horizontal path to the loading station. Because the drive chain 50 and the two sprockets are adjacent one side of the base 28, they can be easily serviced or repaired because of their accessibility. An elongated cover 66, mounted on the frame 44, can be raised and lowered in order to observe the indexing components. Cover 66 also functions as a safety barrier for the moving drive components.

Referring to FIG. 4, the drive means 40 has an output shaft 68 connected to the drive sprocket 46. A suitable indexing mechanism 70 is connected to the drive means 40, and is programmed to index the work fixtures 54 from the loading station toward the transfer station in suitable increments such as two inches, four inches, or six inches, in order to accommodate the nature of the part that is being assembled. A control system 72 connects the tooling station 22 and the indexing device 70 so that the pressing tool 24 operates in synchronized relationship with the drive means 40. Each cap and washer are advanced to the tooling station 22 into alignment with the tool 24, temporarily halted for a sufficient time for the tool 24 to press the cap and washer together, and then the assembled components are indexed to advance the next work fixture into alignment with the pressing tool.

Now referring to FIG. 2, each work fixture 54 comprises a plastic housing 74 connected by fastener 76 to the platen 52 so that the housing 74 is slidably mounted on the platen. An O-ring 78, disposed between the fastener 76 and the housing 74, provides a resilient self-centering mounting for the housing. An elongated track 79, mounted on the track 56, has a slot 80 which extends between opposite sides of the tooling station to provide lateral support for each cap 18. Each cap is mounted stem up on the housing 74 of its work fixture and is guided by the track 79 until the stem 16 is disposed beneath the pressing tool 24. The tool 24 is then moved downwardly to press the washer into the cap 18, and then is returned upwardly to clear the stem 16. The assembled parts are then advanced toward the transfer station 26.

The tool 24 is preferably operated by pneumatic power which is distributed by a manifold 82 to the tooling station which in turn is connected to the control system 72 to lower and raise the tool 24 in synchronization with indexing of the work fixtures 54.

Referring to FIG. 2, the housing 74 has an opening 84 adapted to receive a shot pinning tool 86 in a second assembly operation on the cap and washer. Similarly, other assembly operations can be performed either at the tooling station 22 or at other locations that are in line to one another and substantially parallel to the motion of the work fixtures.

Referring to FIGS. 1 and 5, the caps 18 are delivered to work fixtures at the loading station 20 by a track 88 and a vibratory feeder or the like. The caps 18 are progressively advanced on the work fixtures toward the feed station 14 which comprises a track 90 which introduces the washers 12 to a holding device 92. Each washer is advanced to a position illustrated at A in which it is inclined such that its hole is aligned with the upper edge of the cap stem 16. The stem 16 of each cap is received by the hole of the washer which is then stripped from the holding device 92 as the cap 18 continues its motion toward the tooling station 22. When the washer is free, it falls onto the cap into position for the pressing operation.

This relatively simple and novel feed means operates automatically as the caps are advanced from the loading station, and requires no controls. It is obvious that other annular objects can be fed on each vertically disposed stem 16 in a similar manner to the washer 12.

It is therefore to be understood that I have described a novel automatic indexing machine in which the indexing chassis, the drive means, and the tooling stations are all mounted in line on a common unitary, metal base. All the major moving components are accessible for maintenance, repair or adjustment. Thus the major indexing and tooling components are connected in a unitary structure to provide the precision and control over dimensional tolerances that must be held in small part assembly. It is obvious that although only one tooling station has been illustrated, other tooling stations and feed stations can be mounted on the base.

Having described my invention, I claim:

1. A machine for sequentially performing an assembly operation on a series of similarly-shaped workpieces, comprising:
   (a) an elongated base of unitary construction suited for mounting on a floor or other supporting surface;
   (b) an assembly station mounted on said base, and provided with a tool operative to perform an assembly operation upon a workpiece;
   (c) a drive sprocket mounted adjacent one end of the base, and drive means for rotating the drive sprocket;
   (d) a take-up sprocket mounted adjacent the opposite end of the base;
   (e) a drive chain supported on the sprockets so as to be moved in directions parallel to the length of the base as the drive sprocket is rotated;
   (f) a plurality of work fixtures connected along the chain so as to be moved therewith, the work fixtures being supported on the base so as to be moved along an upper, linear, horizontal path that is parallel to the longitudinal axis of the base and adjacent the assembly station, and a lower, return path that is beneath the upper path, each work fixture being formed so as to receive a workpiece at a loading station adjacent one end of the base, to advance the workpiece to the assembly station for the performance of an assembly operation by the tool, and to remove the workpiece to a transfer station adjacent the other end of the base.

2. An assembly machine as defined in claim 1, including an elongated track mounted on the base so as to slidably support the work fixtures as they are moved along their upper linear path, and to support the work fixtures for tool motions at the assembly station.

3. An assembly machine as defined in claim 2, including cover means mounted on the base to provide a safety barrier between the drive and take-up sprockets.

4. An assembly machine as defined in claim 1, including an elongated frame mounted on the base, adjacent one longitudinal side thereof, the drive sprocket being mounted adjacent one end of the frame, the take-up sprocket being mounted adjacent the other end thereof, an elongated cover mounted on the frame to provide a safety barrier for the chain and the sprockets, and wherein the assembly station is mounted between the frame and the other longitudinal side of the base.

5. An assembly machine as defined in claim 1, including control means connecting the drive means and the assembly station to advance each work fixture to the assembly station, operate the tool to perform an assembly operation on the workpiece supported on each work fixture when it is aligned in the assembly station, and then to remove the work fixture from the assembly station in a timed sequence.

6. An assembly machine for performing an assembly operation on a series of similarly shaped workpieces, comprising:
(a) an elongated, unitary base;
(b) a continuous series of interconnected work fixtures mounted on said base so as to be alternately movable along an upper, linear horizontal path toward a transfer station adjacent one end of the base, and then along a lower return path, beneath the upper path, toward a loading station adjacent the other end of the base;
(c) drive means mounted on the base and connected to the work fixtures to move them along their upper and lower paths; and
(d) an assembly station mounted on the base adjacent the upper path of the work fixtures, and a tool supported on the station to engage a workpiece carried by each work fixture as it is advanced along its upper path to a position adjacent the assembly station, whereby each work fixture receives a workpiece at the loading station, is advanced along the upper path to the assembly station and then to the transfer station for removal of its workpiece, and then is returned along the lower path toward the loading station.

7. An assembly machine as defined in claim 6, in which the work fixtures are moved along upper and lower path adjacent one longitudinal side of the base, and the assembly station is mounted adjacent the other longitudinal side of the base.

8. The assembly machine as defined in claim 1 wherein said elongated base is of a unitary metal construction.

9. The assembly machine as defined in claim 6 wherein said unitary elongated base is of a metal construction.

References Cited

UNITED STATES PATENTS

| | | | |
|---|---|---|---|
| 2,339,807 | 1/1944 | Rau | 29—208 |
| 2,431,279 | 11/1947 | Remington et al. | 29—208 |

THOMAS H. EAGER, Primary Examiner